US005111368A

United States Patent [19]

Suzuki et al.

[11] Patent Number: 5,111,368

[45] Date of Patent: May 5, 1992

[54] SHADE ARRANGEMENT FOR A DUAL FILAMENT BULB IN A VEHICLE HEADLAMP

[75] Inventors: Takanori Suzuki; Tatsuhiko Harada, both of Shizuoka, Japan

[73] Assignee: Koito Manufacturing Co., Ltd., Tokyo, Japan

[21] Appl. No.: 737,877

[22] Filed: Jul. 30, 1991

[30] Foreign Application Priority Data

Aug. 7, 1990 [JP] Japan .................................. 2-208358

[51] Int. Cl.$^5$ .............................................. B60Q 1/04

[52] U.S. Cl. ....................................... 362/61; 362/214

[58] Field of Search ................. 362/61, 211, 214, 215, 362/305, 310

[56] References Cited

U.S. PATENT DOCUMENTS 4,225,903 9/1980 Buchleitner .................... 362/214 X
4,268,895 5/1981 Yabata ................................ 362/307
4,321,658 3/1982 Deverrewaere .................... 362/292
4,882,660 11/1989 Liverance et al. .................. 362/226
4,922,398 5/1990 Muto .................................. 362/296

*Primary Examiner*—Stephen F. Husar
*Attorney, Agent, or Firm*—Sughrue, Mion, Zinn, Macpeak & Seas

[57] ABSTRACT

A vehicle headlamp having a paraboloidal reflector and an electric lighting bulb mounted in a lighting chamber. The paraboloidal reflector is formed to include a pair of vertically opposed flat portions extending therefrom toward a cover lens. The bulb has a vitreous envelope containing a primary filament for providing an upper beam, and an auxiliary filament for providing a lower beam. A shade is disposed between the bulb and the upper flat portion of the reflector in order to prevent the bulb from directly irradiating the upper flat portion of the reflector. Characteristically, the shade is inclined with respect to the optical axis of the headlamp, instead of being disposed parallel thereto, so as to extend in a direction in which the rays of light emitted by the axuilary filament of the bulb travels after having been reflected by part of the paraboliodal reflector, in order to make utmost use of the light rays emitted by the auxilliary filament for providing the lower beam.

8 Claims, 9 Drawing Sheets

SHADE ARRANGEMENT FOR A DUAL FILAMENT BULB IN A VEHICLE HEADLAMP

BACKGROUND OF THE INVENTION

Our invention relates to vehicle headlamps, particularly to those having a dual filament bulb for emitting both an upper beam for distant illumination and a lower beam for illumination of the road ahead of the vehicle when meeting or following another vehicle. More particularly, our invention deals with improvements concerning a bulb shade in such a dual beam vehicle headlamp.

Reflectors shaped like a paraboloid of revolution have been used extensively in vehicle headlamps. In headlamps that are elongated horizontally, primarily for aesthetic purposes, the paraboloidal reflectors have been modified in shape to include flat top and bottom portions in conformity with the shape of the headlamp. Such modified paraboloidal reflectors have given rise to a problem in connection with the flat top portion.

Should the flat top portion of the modified paraboloidal reflector be irradiated directly by a light source such as a dual filament bulb, the headlamp would emit rays of light that were angled sharply downwardly of the vehicle. Some of such light rays would then be reflected again by the front bumper of the vehicle thereby to be diffusely directed upwardly. Such diffuse upward rays would be particularly objectionable during a rainfall as they would produce a glaring screen of light by irradiating the raindrops. Such a glaring light screen would, of course, represent a serious hazard to traffic safety.

We know that a bulb shade has conventionally been employed to prevent the bulb from directly irradiating the flat top portion of the modified paraboloidal reflector. The conventional bulb shade has generally extended parallel to the optical axis of the headlamp. This conventional arrangement of the bulb shade has presented an inconvenience when it has been employed in combination with a dual filament bulb to provide a vehicle headlamp capable of emitting an upper and a lower beam.

As is well known to those versed in the motor vehicle lighting art, the dual filament bulb for use in the dual beam headlamp has a primary and an auxiliary filament contained in a single envelope of vitreous material. Disposed at the focus of the paraboloidal reflector, the primary filament provides the upper beam. The auxiliary filament is displaced from the primary filament in a direction away from the reflector. The light rays that have been emitted by the auxiliary filament become convergent on being reflected by the paraboloidal reflector. The lower beam, which must be angled downwardly, is therefore obtainable by those of the light rays that have been emitted by the auxiliary filament which have been reflected by the upper half of the paraboloidal reflector.

However, as mentioned above, the bulb shade has so far been disposed between the bulb and the flat top portion of the paraboloidal reflector and parallel to the optical axis. So disposed, the conventional bulb shade has cut off some of the light rays that have been emitted by the auxiliary filament and that have been reflected by the upper half of the paraboloidal reflector to provide the lower beam.

It should be borne in mind that, even without the bulb shade, the lower beam is provided only by those of the light rays that have been emitted by the auxiliary filament which have been reflected by the upper half of the paraboloidal reflector. It will be apparent, then, that a further reduction of the amount of such light rays by the conventionally disposed bulb shade represents a serious waste of energy.

SUMMARY OF THE INVENTION

We have hereby invented how to arrange the bulb shade in the dual beam vehicle headlamp of the kind under consideration in order to make utmost use of the light rays emitted by the auxiliary filament of the dual filament bulb to provide the lower beam.

Briefly, our invention may be summarized as a vehicle headlamp capable of emitting an upper beam and a lower beam, comprising a lamp body having a lens secured thereto to define a lighting chamber therebetween. The lighting chamber has reflector means providing a paraboloidal reflective surface generally opposed to the lens, and a pair of substantially opposed flat reflective surfaces disposed between the lens and the paraboloidal reflective surface. The paraboloidal reflective surface has a focus in the lighting chamber and an optical axis extending through the lens. Disposed in the lighting chamber, an electric lighting bulb has an envelope containing both a primary filament and an auxiliary filament. The primary filament is disposed at the focus of the paraboloidal reflective surface for emitting rays of light to be reflected by the paraboloidal reflective surface in order to provide the upper beam. The auxiliary filament is displaced from the primary filament toward the lens for emitting rays of light to be reflected by part of the paraboloidal reflective surface in order to provide the lower beam.

Our invention particularly features a shade disposed between the bulb and at least one of the flat reflective surfaces in order to prevent the light rays emitted by the bulb from falling directly on said one flat reflective surface. The shade is inclined with respect to the optical axis so as to extend in a direction in which the light rays emitted by the auxiliary filament of the bulb travels after having been reflected by said part of the paraboloidal reflective surface.

Disposed at an angle to the optical axis as above, instead of parallel thereto as in the prior art, the shade offers little or no hindrance to the passage of the light rays that have been emitted by the auxiliary filament and that have been reflected by part of the paraboloidal reflective surface. We have thus succeeded in making utmost use of the light rays emitted by the auxiliary filament for providing the lower beam.

Preferably, the shade may be fabricated from sheet metal to include an annular strip portion loosely encircling the bulb, and a major portion extending from the strip portion in a direction away from the lens so as to intervene between the bulb and said one flat reflective surface. The annular strip portion taken together with the major portion is substantially tubular in shape centered approximately about the optical axis. Further the substantially tubular shade tapers as it extends toward the lens, so that the major portion of the shade can be disposed at the required angle to the optical axis. The shade of this tapering tubular shape can be readily mounted to the reflector means via a leg or legs formed in one piece with the shade.

The above and other features and advantages of our invention and the manner of realizing them will become more apparent, and the invention itself will best be understood, from a study of the following description and appended claims, with reference had to the attached drawings showing a preferred embodiment of our invention.

DESCRIPTION OF THE PREFERRED EMBODIMENT

General

Figure 1:
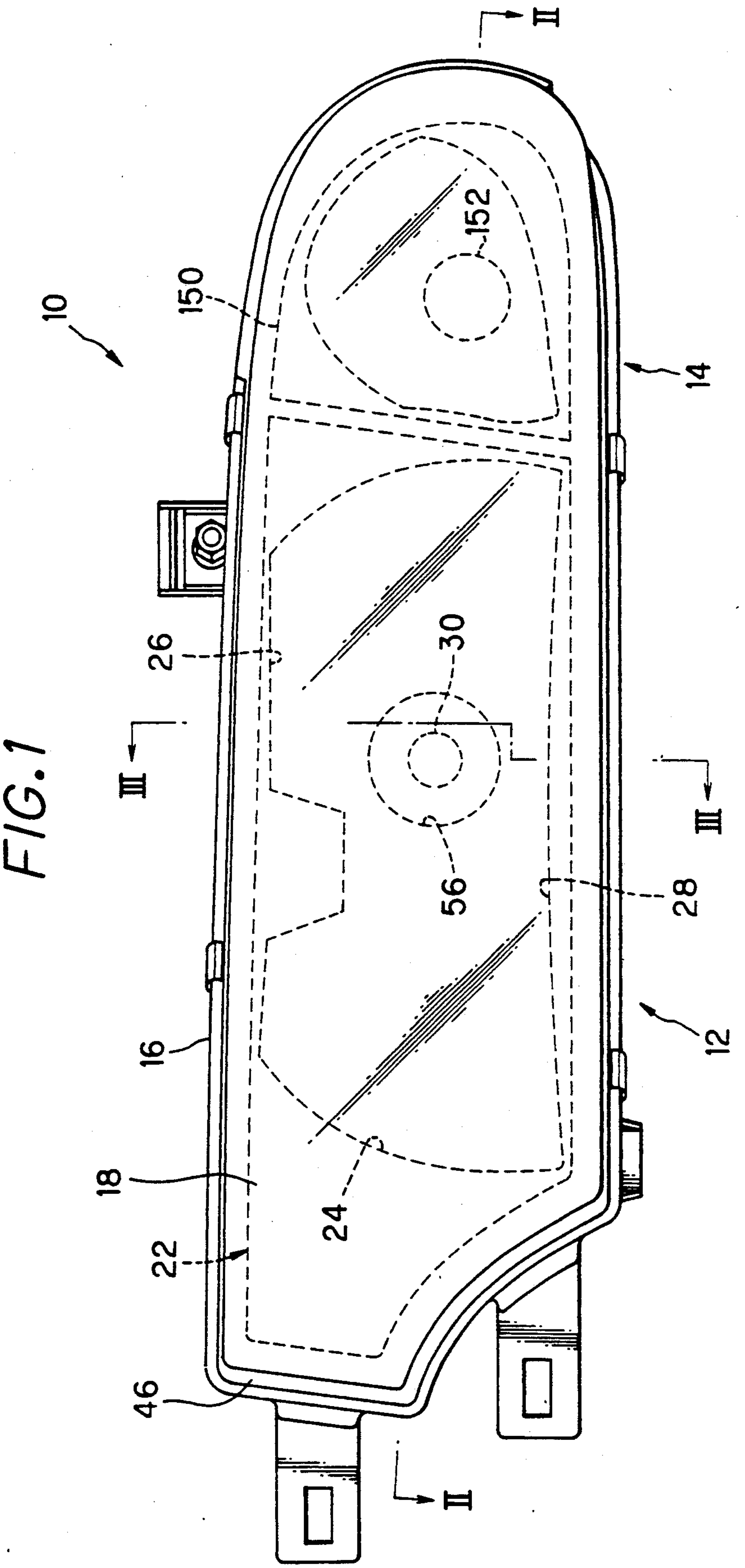
FIG. 1 is a front elevation of a combined headlamp and clearance lamp assembly embodying the principles of our invention.
Figure 2:
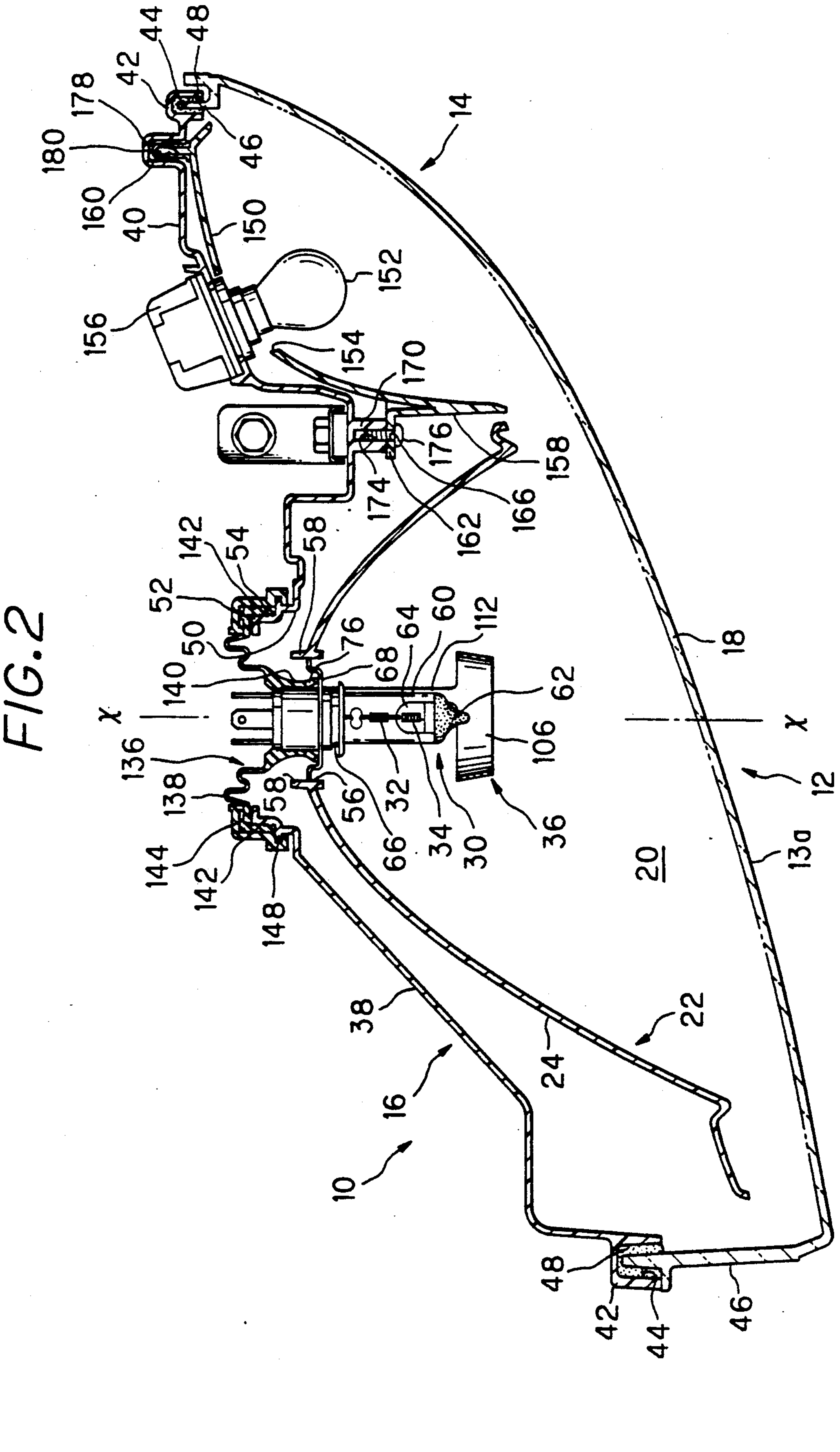
FIG. 2 is a horizontal section through the combination lamp assembly, taken along the line II—II in FIG. 1.
Figure 3:
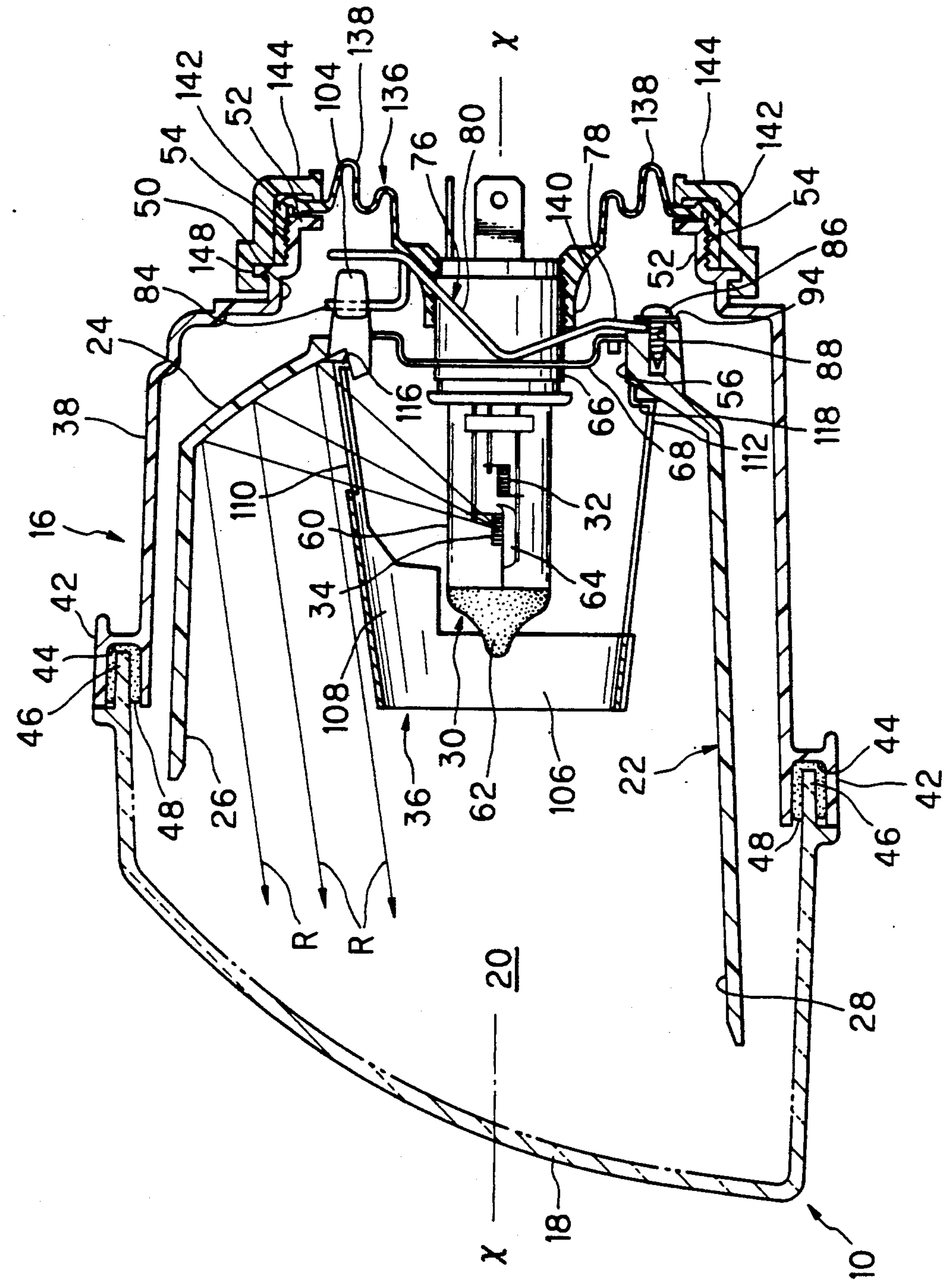
FIG. 3 is a vertical section through the combination lamp assembly, taken along the line III—III in FIG. 1.

We will now describe our invention as embodied in the combined headlamp and clearance lamp assembly shown in the above drawings. Reference may be had primarily to FIGS. 1-3 for a consideration of the general organization of the combination lamp assembly. Generally designated 10, the combination lamp assembly has a headlamp section 12 and a clearance lamp section 14, with the headlamp section occupying approximately three quarters of the horizontal dimension of the combination lamp assembly. It is the headlamp section 12 that incorporates the principles of our invention. The clearance lamp section 14 is shown combined with the headlamp section 12 purely by way of illustration.

Both headlamp section 12 and clearance lamp section 14 of the combination lamp assembly 10 share a lamp body 16 to be mounted fast to a motor vehicle, not shown, and a cover lens 18 secured to the lamp body. The lamp body 16 and a cover lens 18, which are both elongated horizontally, define a lighting chamber 20 therebetween for accommodating various components of the headlamp section 12 and clearance lamp section 14 set forth hereafter.

The headlamp section 12 has a modified paraboloidal reflector 22 disposed in the lighting chamber 20 and oriented toward the cover lens 18. The reflector 22 is mounted to the lamp body 16 via aiming means, not shown, which are per se well known in the art. The unshown aiming means permit the reflector 22 to be tilted both horizontally and vertically with respect to the lamp body 16. The reflector 22 has a major paraboloidal portion 24 shaped like a paraboloid of revolution, which is modified in shape to include a pair of substantially opposed flat portions seen at 26 and 28 in FIGS. 1 and 3, in order to conform to the horizontally elongated shape of the lamp body 16.

Hereinafter in this specification we will use the directional terms "top" and "bottom", "upper" and "lower", and "upward" and "downward", as well as derivatives thereof, in reference to the attitude of the combination lamp assembly 10 as depicted in FIGS. 1 and 3. Thus, for example, the modified paraboloidal reflector 22 has the upper flat portion 26 and the lower flat portion 28. Also, we will use the directional terms "front" and "rear", and "forward" and "rearward", as well as derivatives thereof, to refer to the left and to the right, respectively, of the combination lamp assembly 10 as seen in FIG. 3. Therefore, the lamp body 16 can be spoken of as being disposed relatively rearward the cover lens 18, with the cover lens attached to the annular front edge of the lamp body 16 to define the lighting chamber 20.

Also included in the headlamp section 12 is a dual filament bulb 30 which is mounted to the modified paraboloidal reflector 22. The bulb 30 includes a primary filament 32 and an auxiliary filament 34. The primary filament 32 emits rays of light to be reflected by the paraboloidal portion 24 of the reflector 22 to provide an upper beam. The auxiliary filament 34 emits light rays to be reflected mostly by the upper half of the paraboloidal portion 24 of the reflector 22 to provide a lower beam.

At 36 is seen a bulb shade structure, also included in the headlamp section 12, constituting a feature of our invention. The shade structure 36 functions primarily to shield the upper flat portion 26 of the reflector 22 from the light rays emitted by the auxiliary filament 34 of the bulb 30. The shade structure 36 is also mounted fast to the reflector 22. Our invention particularly concerns the improved arrangement of the shade structure 36 designed to prevent the same from shielding the light rays that have been emitted by the auxiliary filament 34 and that have been reflected by the paraboloidal portion 24 of the reflector 22 to provide the lower beam.

Thus, since the dual filament bulb 30 and bulb shade structure 36 are both rigidly coupled to the modified paraboloidal reflector 22, all these components of the headlamp section 12 are jointly tiltable with respect to the lamp body 16 and cover lens 18. The unshown aiming means therefore permit the aiming of the light beams emitted by the headlamp section 12 of the combination lamp assembly 10.

We will discuss in more detail hereafter the above listed lamp body 16, modified paraboloidal reflector 22, dual filament lighting bulb 30, and bulb shade structure 36 of the headlamp section 12, in that order and under separate headings. Since the clearance lamp section 14 constitutes no essential feature of our invention, we will briefly explain its overall construction after the discussion of the listed components of the headlamp section 12.

Lamp Body

With reference to FIGS. 1-3 we have shown the lamp body 16 as a unitary molding of a plastic, comprising a portion 38 included in the headlamp section 12 and a portion 40 included in the clearance lamp section 14. The lamp body 16 is generally concave, opening forwardly, and is elongated horizontally.

The lamp body 16 is molded to include a flange 42 extending all along its front edge. The flange 42 defines a forwardly open groove 44 of annular shape. The cover lens 18 has an annular rim 46 turned rearwardly from its periphery and received with clearance in the lamp body groove 44. A suitable sealant 48 such as an adhesive is filled in the space left in the lamp body groove 44 by the cover lens rim 46.

A relatively large clearance hole 50 is formed approximately centrally in the headlamp portion 38 of the lamp body 16. The clearance hole 50 is bounded by an annular rim 52 molded in one piece with the lamp body 16 and extending rearwardly therefrom. The annular rim 52 is externally threaded or knurled at 54.

The cover lens 14 is a generally flat piece of vitreous or other transparent material, curved both horizontally as shown in FIG. 2 and vertically as in FIG. 3. It is understood that the cover lens 14 conventionally includes flutes, prisms or the like, not shown, to serve as a lens.

Modified Paraboloidal Reflector

As shown also in FIGS. 1-3, the reflector 22 comprises as aforesaid the major paraboloidal portion 24, the top flat portion 26 and the bottom flat portion 28, preferably all integrally molded from a plastic material. The inside surfaces of all these reflector portions 24-28 are rendered reflective as by the vapor deposition of aluminum. It will be understood from FIG. 1 in particular that the paraboloidal reflector is modified into the illustrated shape in order to conform to the horizontally elongated shape of the headlamp section 12 of the combination lamp assembly 10.

A mounting hole 56 is cut approximately centrally in the paraboloidal portion 24 of the reflector 22 for use in mounting the lighting bulb 30. As revealed by both FIGS. 2 and 4, the mounting hole 56 is bounded in part by a pair of diametrically opposed positioning walls 58 of arcuate shape, also for use in mounting the lighting bulb 30. We will describe in more detail these positioning walls 58, as well as additional means formed behind the reflector 22 in one piece therewith, in connection with the lighting bulb 30.

Dual Filament Bulb

Figure 5:
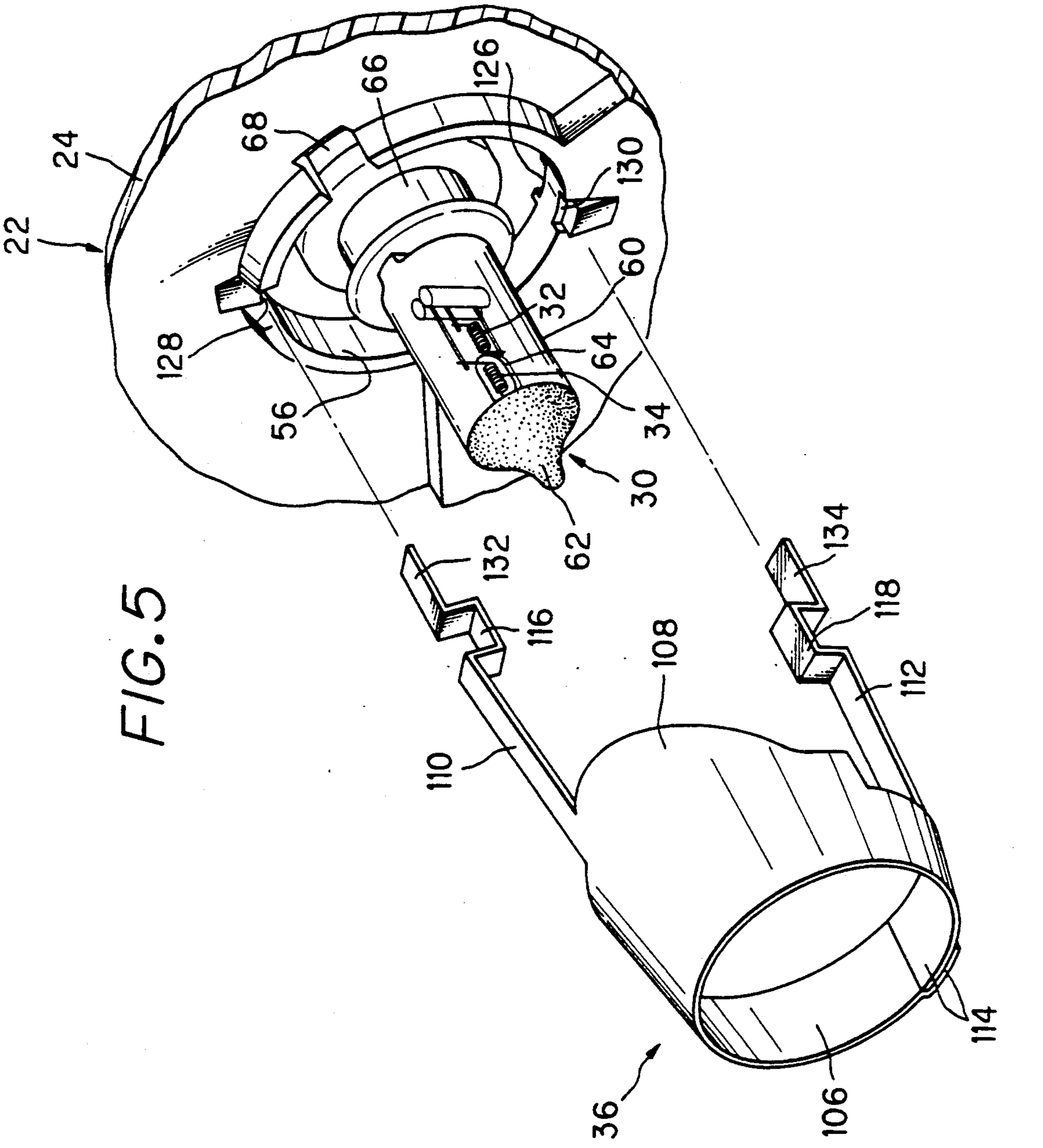
FIG. 5 is an enlarged, exploded perspective view showing the bulb, the bulb shade structure, and part of the reflector, all included in the combination lamp assembly.
Figure 6:
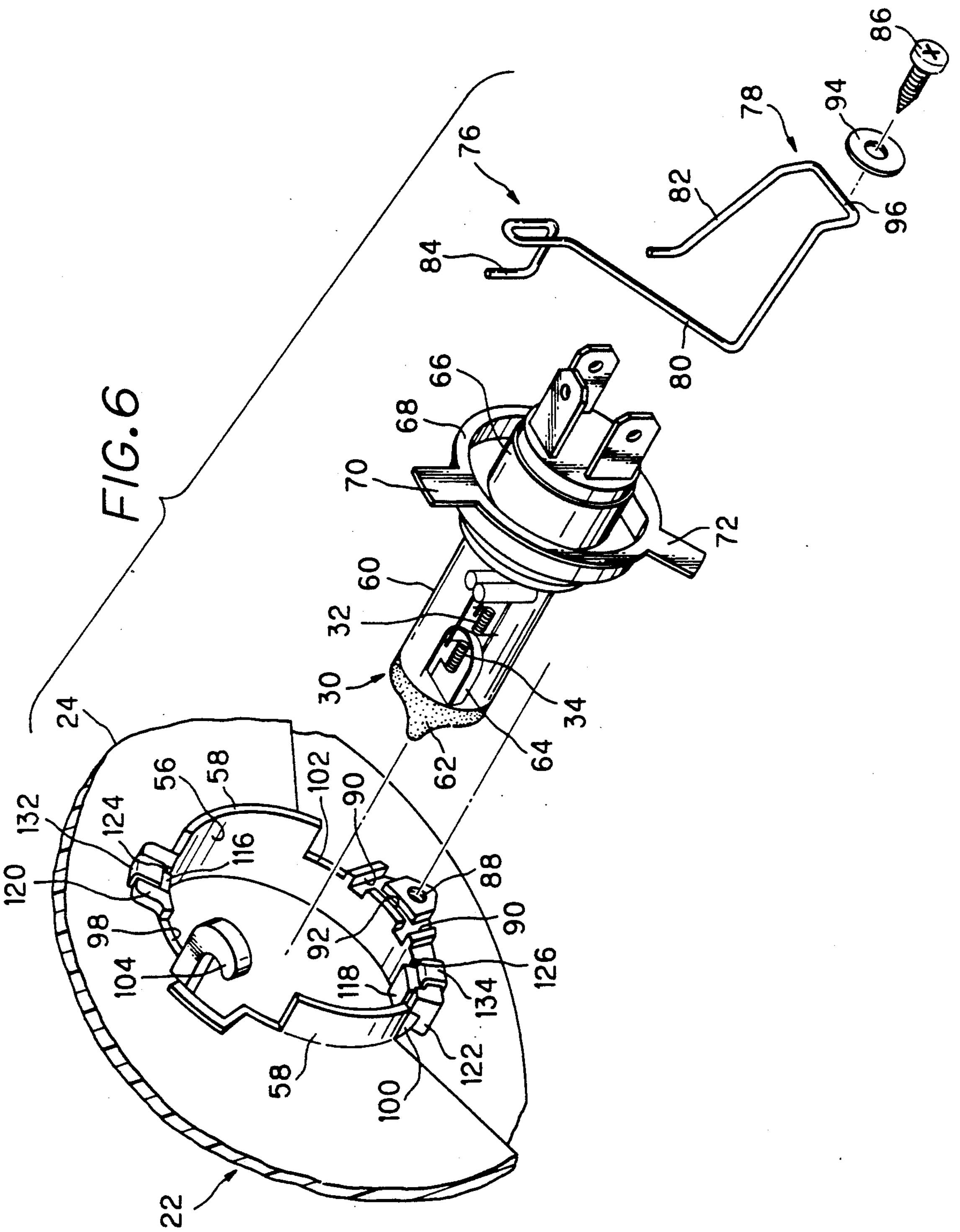
FIG. 6 is an enlarged, exploded perspective view of the bulb, the bulb retainer wire, and part of the reflector, all included in the combination lamp assembly.

The dual filament lighting bulb 30 is illustrated in phantom outline in FIG. 1, in top plan in FIG. 2, in side elevation in FIG. 3, and in perspective in FIGS. 5 and 6. The bulb 30 has a generally tubular envelope 60 of vitreous material with an opaque coating 62 on its tip end portion. The envelope 60 conventionally contains the coiled primary filament 32 and the coiled auxiliary filament 34. Aligned with the optical axis X—X of the headlamp, the primary filament 32 is disposed approximately at the focus of the paraboloidal reflector 22. The auxiliary filament 34 is somewhat displaced forwardly of the primary filament 32. The primary filament 32 serves as a light source of the upper beam, and the auxiliary filament 34 as a light source of the lower beam. As is also well known in the art, a boatlike shade 64 is mounted under the auxiliary filament 34 within the envelope 60 for cutting off those of the light rays emitted by the auxiliary filament which are unnecessary for providing the lower beam.

The bulb 30 has a base 66 having a flange 68 with three lugs 70, 72 and 74 extending radially therefrom at unequal circumferential spacings. These lugs are for use in mounting the bulb 30 to the reflector 22 in the correct angular position about the optical axis X—X, as will be detailed hereafter.

Figure 4:
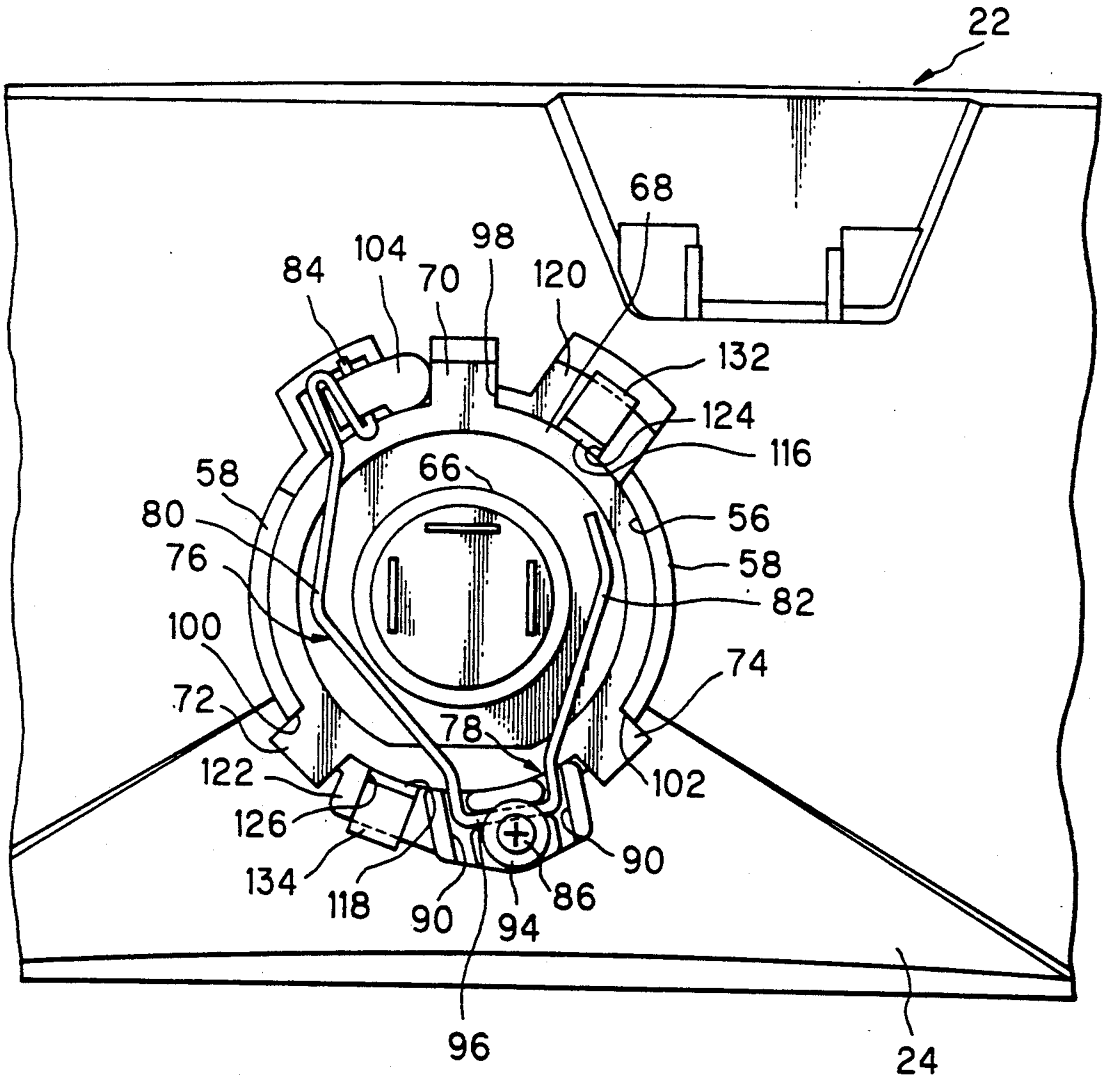
FIG. 4 is an enlarged, fragmentary rear elevation of a modified paraboloidal reflector forming a part of the headlamp section of the combination lamp assembly, showing in particular how the bulb is mounted to the reflector.
Figure 4:

A bulb retainer wire 76 of resilient material is shown in FIGS. 2-4 in its working position on the back of the reflector 22 and shown detached therefrom in FIG. 6. Although rather complex in shape, the bulb retainer wire 76 may be thought of as comprising a U shaped pivot or base portion 78, a pair of divergent push arms 80 and 82 extending from the opposite ends of the pivot portion, and a hook portion 84 further extending from the push arm 80.

The bulb retainer wire 76 is to have its pivot portion 78 screwed at 86 to the back of the reflector 22 before the bulb 30 is mounted thereto. As will be understood from FIGS. 4 and 6, the reflector 22 has a screw hole 88 formed in its back in the immediate vicinity of the mounting hole 56. Also, on the opposite sides of the screw hole 88, a pair of grooves 90 are formed in parallel spaced relation to each other. Another groove 92 extends between the pair of grooves 90. The U shaped pivot portion 78 of the bulb retainer wire 76 is somewhat loosely engaged in these grooves 90 and 92. Then the screw 86, complete with a washer 94, is engaged in the hole 88, with the result that the washer 94 overlies the limb 96 of the pivot portion 78. Thus confined in the groove 92, the limb 96 is rotatable therein; that is, the bulb retainer wire 76 is pivotable about the limb 96 of the pivot portion 78 relative to the reflector 22. Pivotally mounted in this manner to the reflector 22, the bulb retainer wire 76 may be held turned away from the reflector so as not to interfere with the subsequent mounting of the bulb 30.

Then the bulb 30 with the base 66 may be inserted forwardly in and through the mounting hole 56 in the reflector 22 until the three lugs 70, 72 and 74 on the bulb base flange 68 become engaged in recesses 98, 100 and 102, respectively, in the back of the reflector. Then the bulb retainer wire 76 may be turned up about the limb 96 of its pivot portion 78, and its hook portion 84 may be engaged with a hook 104 on the back of the reflector 22. The pair of push arms 80 and 82 of the bulb retainer wire 76 will then come into forced abutment against the bulb base flange 68.

The mounting of the bulb 30 to the reflector 22 has now been completed. It will be seen that the bulb 30 is precisely positioned with respect to the reflector 22 as the lugs 70-74 on the bulb base flange 68 are engaged in the recesses 98-102 in the reflector and as the bulb base flange is caught between the pair of positioning walls 58 on the reflector. Furthermore, the bulb 30 is positively maintained in this required position on the reflector 22 by the bulb retainer wire 76.

Bulb Shade Structure

Figure 7:
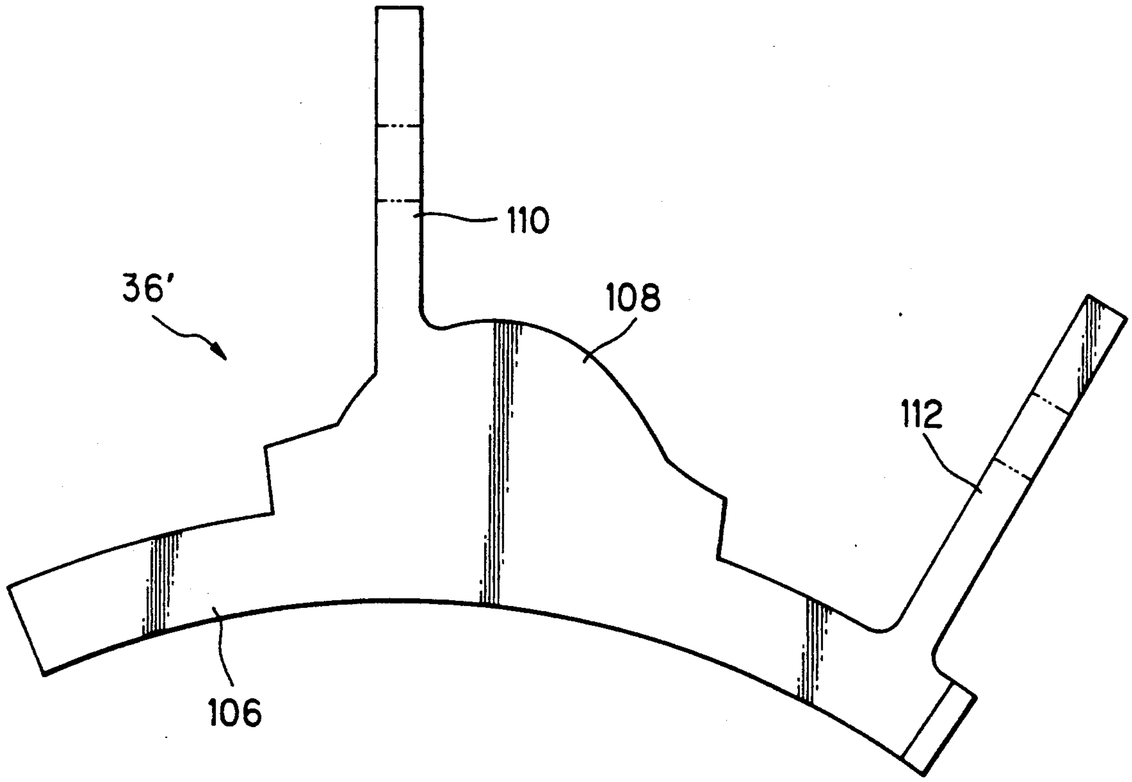
FIG. 7 is an enlarged developed view of the bulb shade structure of the combination lamp assembly.

Reference may be had primarily to FIGS. 5 and 7 for the following description of the bulb shade structure 36, although it appears also in FIGS. 2 and 3 and in part in FIG. 4 as well.

Typically, the shade structure 36 takes the form of a punching 36' of sheet metal pictured in FIG. 7. We particularly recommend aluminum as a material of the shade structure 36. However, since the shade structure should not reflect the light emitted by the bulb 30, aluminum in sheet form may be degreased and subsequently fired at 250 degrees centigrade for one hour or so. The sheet metal punching 36′ comprises an elongate strip portion 106, a major portion 108 of approximately semicircular shape, and a pair of mounting legs 110 and 112.

Before being mounted in position within the headlamp, the sheet metal punching 36′ is rounded into the form of the substantially tubular shade structure 36 best seen in FIG. 5. It will be noted that the strip portion 106 is completely rounded into annular shape with its opposite end portions 114 lapped one over the other. These lapping end portions 114 may be firmly joined together, preferably by welding, in order to maintain the shade structure 36 in the illustrated substantially tubular shape. It will also be observed that the mounting legs 110 and 112 are bent to provide U shaped portions 116 and 118.

Fabricated as above into the shape best depicted in FIG. 5, the shade structure 36 is to be mounted to the reflector 22 before the bulb 30 is mounted thereto in the manner set forth above. The reflector 22 is specifically configured as follows for the ease of mounting of the shade structure 36.

As will be noted from FIGS. 4 and 6, the reflector 22 has two U shaped projections 120 and 122 formed on its back so as to define recesses 124 and 126 open to the mounting hole 56. FIG. 5 indicates similar recesses 128 and 130 formed in the front of the reflector 22 in register with the recesses 124 and 126, respectively.

Thus, for mounting the shade structure 36, its pair of mounting legs 110 and 112 may be inserted rearwardly in the mounting hole 56 in the reflector 22. Then the U shaped bends 116 and 118 of the mounting legs 110 and 112 may be placed astride the reflector edge bounding the mounting hole 56, with the opposed limbs of the bends 116 and 118 engaged respectively in the recesses 124 and 126 in the back of the reflector and in the recesses 128 and 130 in the front of the reflector. Then, as illustrated in both FIGS. 4 and 6, the rearward extensions 132 and 134 of the mounting legs 110 and 112 may be bent away from each other over and against the projections 120 and 122 on the back of the reflector 22. The mounting of the shade structure 36 has now been completed. The bulb 30 may subsequently be mounted to the reflector 22 in the manner explained previously.

FIG. 3 best illustrates the shade structure 36 mounted as above to the reflector 22. Centered approximately about the optical axis X—X, the annular strip portion 106 of the shade structure 36 loosely encircles the tip portion 62 of the bulb 30. The major semicircular portion 108 of the shade structure 36 extends rearwardly from the strip portion 106 and overlies the bulb 30. It is thus seen that the major portion 108 of the shade structure 36 intervenes between the bulb 30 and the top flat portion 26 of the modified paraboloidal reflector 22, thereby conventionally functioning to prevent the light rays emitted by the bulb from falling directly on the top flat portion of the reflector.

An inspection of FIG. 3 will also reveal that the shade structure 36 generally tapers forwardly in accordance with a feature of our invention. Therefore, the major portion 108 of the shade structure 36 when taken by itself is inclined downwardly, or toward the optical axis X—X, as it extends forwardly, instead of being parallel to the optical axis as in the prior art. The angle of inclination of the major portion 108 with respect to the optical axis X—X is such that it extends in the direction in which the light rays emitted by the auxiliary filament 34 of the bulb 30 travels after having been reflected by the upper half of the paraboloidal portion 24 of the reflector 22. Such light rays to provide the lower beam are designated R in FIG. 3. It will therefore be appreciated that the shade structure 36 according to our invention offers little or no hindrance to the passage of the light rays R but can nevertheless fully perform its intended functions.

At 136 in FIGS. 2 and 3 is seen a rear bellows cover of rubber or like elastic material watertightly closing the annular gap left in the clearance hole 50 in the lamp body 16 by the base 66 of the bulb 30. The bellows cover 136 has a pleated annular portion 138 having an inner rim 140 held against the bulb base 66, and an outer rim 142 fitted over the threaded or knurled rim 52 of the lamp body 16. Thus, thanks to the bellows construction and elastic material of the rear cover 136, the reflector 22 is tiltable with respect to the lamp body 16.

A retainer ring 144 of rigid plastic material is fitted over the outer rim 142 of the bellows cover 136 in order to firmly retain the same in position on the lamp body rim 52. Positively engaging an annular rib 148 on the lamp body rim 52, the retainer ring 144 is itself prevented from accidental detachment from the lamp body 16.

Clearance Lamp Section

As illustrated in FIG. 2, the clearance lamp section 14 of the combination lamp assembly 10 comprises a concave reflector 150 and an incandescent lamp bulb 152. Disposed in the lighting chamber 20, the reflector 150 is immovably mounted to the clearance lamp portion 40 of the lamp body 16. The bulb 152 is disposed centrally of the reflector 150 and, extending through a clearance hole 154 in the reflector 150, replaceably engaged in a socket/plug assembly 156 which is itself replaceably mounted to the lamp body 16.

Figure 8:
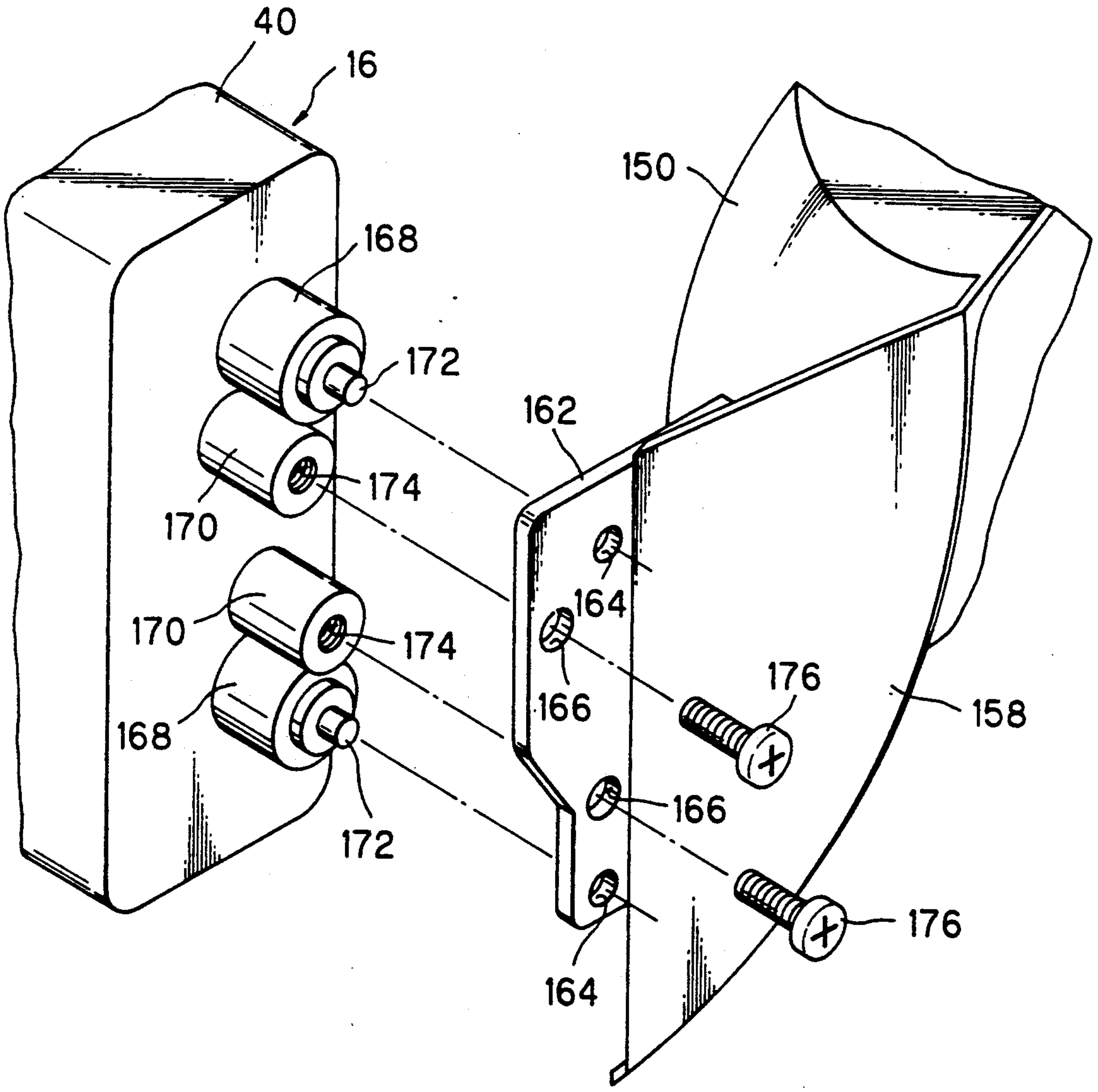
FIG. 8 is an enlarged, fragmentary, exploded perspective view showing how the reflector of the clearance lamp section of the combination lamp assembly is mounted to the lamp body.
Figure 9:
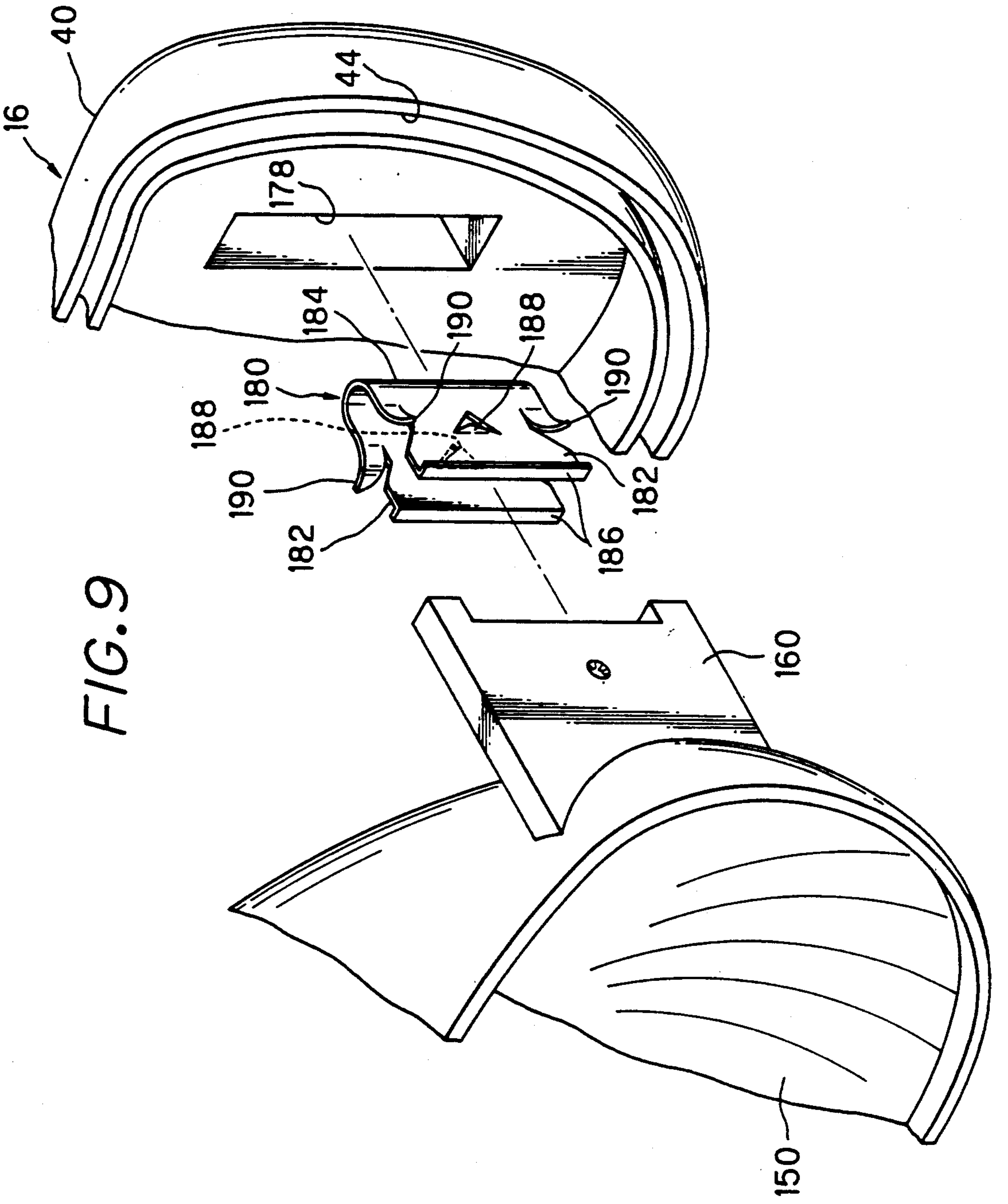
FIG. 9 is also an enlarged, fragmentary, exploded perspective view showing how the reflector of the clearance lamp section of the combination lamp assembly is mounted to the lamp body.

Reference may be had to FIGS. 8 and 9 for a study of how the reflector 150 is immovably mounted to the clearance lamp portion 40 of the lamp body 16. As will be seen from these figures, taken together with FIG. 2, the reflector 150 has two fins 158 and 160 extending rearwardly from its opposite extremities in the horizontal direction. The fin 158 has a flange 162 bent right angularly from its rear edge. The flange 162 has a pair of vertically spaced positioning holes 164 and, between these positioning holes, a pair of vertically spaced mounting holes 166 formed therethrough.

As shown in detail in FIG. 8, the lamp body 16 has a pair of positioning bosses 168 and a pair of mounting bosses 170 projecting forwardly therefrom in register with the positioning holes 164 and mounting holes 166, respectively, in the reflector flange 162. The positioning bosses 168 have positioning pins 172 extending forwardly therefrom for engagement in the positioning holes 164. The mounting bosses 170 have formed therein tapped holes 174 for receiving screws 176 passing through the mounting holes 166.

The other fin 160 on the reflector 150 is engaged in a groove 178 in the lamp body 16 via a retainer clip 180. The retainer clip 180 takes the form of a generally rectangular piece of resilient sheet metal, bent into the shape of a U to provide a pair of opposed flaps 182 with a spine 184 joining their rear edges. The front edges of the flaps 182 are bent away from each other to provide a pair of flanges 186. The clip 180 is further formed to include a pair of pointed reflector detents 188 disposed centrally of the flaps 182 and oriented toward each other and away from the reflector 150, and two additional pairs of pointed lamp body detents 190 disposed at the top and bottom edges of the flaps 182 and oriented away from each other and toward the reflector 150.

The retainer clip 180 is to be fitted over the fin 160 on the reflector 150 before this reflector is mounted to the lamp body 16. Fully receiving the fin 160 therebetween, the pair of opposed flaps 182 of the clip 180 will be self biased against the fin, with the pair of reflector detents 188 tending to bite into the fin against movement in a direction away from the spine 184.

Then the pair of positioning pins 172 on the lamp body 16 may be inserted in the positioning holes 164 in the flange 162 on the other fin 158 of the reflector 150. Then the fin 160 on the retainer clip 180 thereon may be pushed into the groove 178 in the lamp body 16. Once pushed fully into the groove 178, the retainer clip 180 will lock itself up within the groove and resist any force tending to pull the clip out of the groove as the two pairs of lamp body detents 190 will then bite into the lamp body walls defining the groove. Thus, being itself positively captured by and between the pair of reflector detents 188 of the clip 180, the reflector fin 160 will remain engaged in the lamp body groove 178 in the face of vibrations or shocks that may be exerted on the combination lamp assembly 10 in use on a motor vehicle.

Then the pair of screws 176 may be inserted in and through the holes 166 in the reflector flange 162 and engaged in the tapped holes 174 in the lamp body 16. The mounting of the clearance lamp reflector 150 to the lamp body 16 has now been completed.

Although we have shown and described our invention as embodied in a combination lamp assembly comprising an aimable headlamp section and a clearance lamp section, it is understood, of course, that this embodiment is meant purely to illustrate or explain and not to impose limitations upon our invention. Our invention may be applied to nonaimable and various other types of vehicle headlamps, and changes may be made in the details of the illustrated embodiment, without departing from the proper scope or fair meaning of the appended claims.

We claim:

1. A vehicle headlamp capable of emitting an upper beam and a lower beam, comprising:

(a) a lamp body;

(b) a lens secured to the lamp body to define a lighting chamber therebetween;

(c) reflector means in the lighting chamber providing a paraboloidal reflective surface generally opposed to the lens, and a pair of substantially opposed flat reflective surfaces disposed between the lens and the paraboloidal reflective surface, the paraboloidal reflective surface having a focus in the lighting chamber and an optical axis extending through the lens;

(d) an electric lighting bulb disposed in the lighting chamber, the bulb having an envelope containing both a primary filament and an auxiliary filament, the primary filament being disposed at the focus of the paraboloidal reflective surface for emitting rays of light to be reflected by the paraboloidal reflective surface in order to provide an upper beam, the auxiliary filament being displaced from the primary filament toward the lens for emitting rays of light to be reflected by part of the paraboloidal reflective surface in order to provide a lower beam; and (e) a shade disposed between the bulb and at least one of the flat reflective surfaces in order to prevent the light rays emitted by the bulb from falling directly on said one flat reflective surface, the shade being inclined with respect to the optical axis so as to extend in a direction in which the light rays emitted by the auxiliary filament of the bulb travels after having been reflected by said part of the paraboloidal reflective surface;

(f) whereby a decrease in the intensity of the lower beam due to the shade is reduced to a minimum.

2. The vehicle headlamp of claim 1 wherein the shade is of substantially tubular shape centered approximately about the optical axis, the tubular shade generally tapering toward the lens.

3. The vehicle headlamp of claim 2 wherein the shade is of sheet material integrally comprising:

(a) an annular strip portion loosely encircling the bulb; and (b) a major portion extending from the strip portion in a direction away from the lens.

4. The vehicle headlamp of claim 3 wherein the major portion of the shade is of approximately semicircular shape.

5. A vehicle headlamp capable of emitting an upper beam and a lower beam, comprising:

(a) a lamp body;

(b) a lens secured to the lamp body to define a lighting chamber therebetween;

(c) a reflector disposed in the lighting chamber and aimably mounted to the lamp body, the reflector having a paraboloidal surface generally opposed to the lens, and a pair of substantially opposed flat surfaces disposed between the lens and the paraboloidal surface, the paraboloidal surface of the reflector having a focus in the lighting chamber and an optical axis extending through the lens;

(d) an electric lighting bulb mounted to the reflector and disposed in the lighting chamber, the bulb having an envelope containing both a primary filament and an auxiliary filament, the primary filament being disposed at the focus of the paraboloidal surface of the reflector for emitting rays of light to be reflected by the paraboloidal surface in order to provide an upper beam, the auxiliary filament being displaced from the primary filament toward the lens for emitting rays of light to be reflected by part of the paraboloidal surface of the reflector in order to provide a lower beam; and (e) a shade mounted to the reflector and disposed between the bulb and at least one of the flat surfaces of the reflector in order to prevent the light rays emitted by the bulb from falling directly on said one flat surface, the shade being inclined with respect to the optical axis so as to extend in a direction in which the light rays emitted by the auxiliary filament of the bulb travels after having been reflected by said part of the paraboloidal surface of the reflector;

(f) whereby a decrease in the intensity of the lower beam due to the shade is reduced to a minimum.

6. The vehicle headlamp of claim 5 wherein the shade is of substantially tubular shape centered approximately about the optical axis, the tubular shade generally tapering toward the lens.

7. The vehicle headlamp of claim 6 wherein the shade is of sheet material integrally comprising:

(a) an annular strip portion loosely encircling the bulb;

(b) a major portion extending from the strip portion in a direction away from the lens; and (c) leg means connecting the strip portion and the major portion to the reflector.

8. The vehicle headlamp of claim 7 wherein the major portion of the shade is of approximately semicircular shape.

* * * * *